United States Patent
Janko et al.

(10) Patent No.: US 11,763,127 B2
(45) Date of Patent: *Sep. 19, 2023

(54) TIRE TRACKING RFID LABEL

(71) Applicant: Avery Dennison Corporation, Mentor, OH (US)

(72) Inventors: Pavel Janko, Haarlem (NL); Denis Markov, Amsterdam (NL)

(73) Assignee: Avery Dennison Corporation, Mentor, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/938,141

(22) Filed: Oct. 5, 2022

(65) Prior Publication Data

US 2023/0026098 A1    Jan. 26, 2023

Related U.S. Application Data

(63) Continuation of application No. 17/243,692, filed on Apr. 29, 2021, now Pat. No. 11,494,604, which is a continuation of application No. 16/773,189, filed on Jan. 27, 2020, now Pat. No. 10,997,487, which is a continuation of application No. 16/181,430, filed on Nov. 6, 2018, now Pat. No. 10,586,144, which is a continuation of application No. 15/514,504, filed as application No. PCT/US2015/052776 on Sep. 29, 2015, now Pat. No. 10,152,672.

(60) Provisional application No. 62/072,806, filed on Oct. 30, 2014, provisional application No. 62/056,920, filed on Sep. 29, 2014.

(51) Int. Cl.
| | | |
|---|---|---|
| G06K 19/077 | (2006.01) | |
| C09J 9/00 | (2006.01) | |
| C09J 7/38 | (2018.01) | |
| B29D 30/00 | (2006.01) | |
| B29D 30/72 | (2006.01) | |

(52) U.S. Cl.
CPC .......... *G06K 19/07764* (2013.01); *C09J 7/38* (2018.01); *C09J 9/00* (2013.01); *G06K 19/07722* (2013.01); *B29D 2030/0083* (2013.01); *B29D 2030/726* (2013.01); *B29D 2030/728* (2013.01); *C09J 2203/326* (2013.01); *C09J 2203/334* (2013.01); *C09J 2433/00* (2013.01)

(58) Field of Classification Search
CPC ........ G06K 19/07764; G06K 19/07722; C09J 7/38
USPC ........................................................ 235/488
See application file for complete search history.

(56) References Cited

U.S. PATENT DOCUMENTS

| | | |
|---|---|---|
| 3,919,035 A | 11/1975 | Warrach |
| 5,352,743 A | 10/1994 | Coolbaugh et al. |

(Continued)

FOREIGN PATENT DOCUMENTS

| | | |
|---|---|---|
| BR | PI0605150 | 6/2007 |
| BR | PI0603158 | 3/2008 |

(Continued)

OTHER PUBLICATIONS

William Frick & Company, "RFID Tag Technical Data Sheet."
(Continued)

*Primary Examiner* — Allyson N Trail

(57) ABSTRACT

Identification labels and their incorporation in rubber-based articles are described. The labels include RFID components and can be incorporated in tires. The labels can withstand the relatively harsh conditions associated with vulcanization.

16 Claims, 7 Drawing Sheets

(56) References Cited

U.S. PATENT DOCUMENTS

| | | |
|---|---|---|
| 5,709,918 A | 1/1998 | Kimijima et al. |
| 5,824,397 A | 10/1998 | Koops et al. |
| 6,206,292 B1 | 3/2001 | Robertz et al. |
| 6,262,144 B1 | 7/2001 | Zhao et al. |
| 6,358,605 B1 | 3/2002 | Casper |
| 6,429,831 B2 | 8/2002 | Babb |
| 7,009,576 B2 | 3/2006 | Adamson et al. |
| 7,045,186 B2 | 5/2006 | Grabau et al. |
| 7,050,017 B2 | 5/2006 | King et al. |
| 7,091,841 B2 | 8/2006 | Adamson et al. |
| 7,095,324 B2 | 8/2006 | Conwell et al. |
| 7,135,979 B2 | 11/2006 | Savagian et al. |
| 7,209,039 B2 | 4/2007 | Krebs |
| 7,259,678 B2 | 8/2007 | Brown et al. |
| 7,292,138 B2 | 11/2007 | Jang |
| 7,298,330 B2 | 11/2007 | Forster et al. |
| 7,302,751 B2 | 12/2007 | Hamburgen |
| 7,315,248 B2 | 1/2008 | Egbert et al. |
| 7,320,751 B2 | 1/2008 | Donatelli |
| 7,338,914 B2 | 3/2008 | Conwell et al. |
| 7,342,490 B2 | 3/2008 | Herrmann et al. |
| 7,368,032 B2 | 5/2008 | Green et al. |
| 7,429,413 B2 | 9/2008 | Adair et al. |
| 7,450,011 B2 | 11/2008 | Duschek |
| 7,479,614 B2 | 1/2009 | Eastin |
| 7,479,888 B2 | 1/2009 | Jacober et al. |
| 7,497,004 B2 | 3/2009 | Cote et al. |
| 7,586,415 B2 | 9/2009 | Lee |
| 7,646,304 B2 | 1/2010 | Cote et al. |
| 7,703,687 B2 | 4/2010 | Barczyk et al. |
| 7,786,868 B2 | 8/2010 | Forster |
| 7,855,647 B2 | 12/2010 | Fronek et al. |
| 7,884,726 B2 | 2/2011 | Cote et al. |
| 7,918,455 B2 | 4/2011 | Chapet et al. |
| 7,998,546 B2 | 8/2011 | Wisnudel et al. |
| 8,063,741 B2 | 11/2011 | Hioki et al. |
| 8,072,336 B2 | 12/2011 | Uehara et al. |
| 8,157,172 B2 | 4/2012 | Fenkanyn |
| 8,231,060 B2 | 7/2012 | Tucker et al. |
| 8,251,295 B2 | 8/2012 | Ritamaki et al. |
| 8,334,036 B2 | 12/2012 | Buchbinder et al. |
| 8,430,142 B2 | 4/2013 | Incavo et al. |
| 8,430,324 B2 | 4/2013 | Baba et al. |
| 8,490,882 B2 | 7/2013 | Margulis et al. |
| 8,633,821 B2 | 1/2014 | Forster |
| 8,692,674 B2 | 4/2014 | Hioki et al. |
| 8,794,533 B2 | 8/2014 | Cote et al. |
| 9,385,420 B2 | 7/2016 | Tucker |
| 9,542,550 B2 | 1/2017 | Robshaw et al. |
| 9,553,729 B2 | 1/2017 | Robshaw |
| 9,563,837 B1 | 2/2017 | Lai et al. |
| 9,626,617 B2 | 4/2017 | Martin et al. |
| 9,636,857 B2 | 5/2017 | Nishizawa et al. |
| 9,701,080 B2 | 7/2017 | Tucker |
| 9,798,970 B2 | 10/2017 | Matsumura |
| 9,972,884 B2 | 5/2018 | Matsumura et al. |
| 10,032,104 B2 | 7/2018 | Matsumura et al. |
| 10,192,160 B2 | 1/2019 | Loussert et al. |
| 2001/0034257 A1 | 10/2001 | Weston et al. |
| 2002/0018009 A1 | 2/2002 | Rast |
| 2002/0045272 A1 | 4/2002 | McDevitt et al. |
| 2002/0126878 A1 | 9/2002 | Al-Sheikh |
| 2002/0135481 A1 | 9/2002 | Conwell et al. |
| 2003/0060212 A1 | 3/2003 | Thomas |
| 2003/0067389 A1 | 4/2003 | Look |
| 2003/0132853 A1 | 7/2003 | Ebert |
| 2003/0173717 A1 | 9/2003 | Abrams et al. |
| 2003/0211273 A1 | 11/2003 | Perry et al. |
| 2004/0010706 A1 | 1/2004 | Stevens |
| 2004/0084517 A1 | 5/2004 | Harm et al. |
| 2004/0095244 A1 | 5/2004 | Conwell et al. |
| 2004/0103974 A1 | 6/2004 | Majumdar et al. |
| 2004/0164147 A1 | 8/2004 | Jenkins et al. |
| 2005/0035847 A1 | 2/2005 | Bonalle et al. |
| 2005/0059308 A1 | 3/2005 | Parsons |
| 2005/0072842 A1 | 4/2005 | Yamagiwa |
| 2005/0093677 A1 | 5/2005 | Forster et al. |
| 2005/0128086 A1 | 6/2005 | Brown et al. |
| 2005/0149741 A1 | 7/2005 | Humbel |
| 2005/0216313 A1 | 9/2005 | Claud et al. |
| 2005/0221704 A1 | 10/2005 | Conwell et al. |
| 2005/0268734 A1 | 12/2005 | Watkins, Jr. et al. |
| 2006/0111868 A1 | 5/2006 | Beshears et al. |
| 2006/0161621 A1 | 7/2006 | Rosenberg |
| 2006/0162846 A1 | 7/2006 | Roach et al. |
| 2006/0170436 A1 | 8/2006 | Berson |
| 2006/0180647 A1 | 8/2006 | Hansen |
| 2006/0238334 A1 | 10/2006 | Mangan et al. |
| 2006/0251498 A1 | 11/2006 | Buzzoni et al. |
| 2006/0289637 A1 | 12/2006 | Brice et al. |
| 2006/0290500 A1 | 12/2006 | Sagawa |
| 2006/0290505 A1 | 12/2006 | Conwell et al. |
| 2007/0024939 A1 | 2/2007 | Harris |
| 2007/0088268 A1 | 4/2007 | Edwards |
| 2007/0094268 A1 | 4/2007 | Tabe |
| 2007/0118542 A1 | 5/2007 | Sweeney |
| 2007/0158436 A1 | 7/2007 | Ichikawa et al. |
| 2007/0210923 A1 | 9/2007 | Butler et al. |
| 2007/0276619 A1 | 11/2007 | Sugahara et al. |
| 2008/0023343 A1 | 1/2008 | Macor |
| 2008/0169926 A1 | 7/2008 | Reep |
| 2008/0176713 A1 | 7/2008 | Olivera et al. |
| 2009/0026263 A1 | 1/2009 | Schmid et al. |
| 2009/0033495 A1 | 2/2009 | Abraham et al. |
| 2009/0055014 A1 | 2/2009 | Lehrieder |
| 2009/0108065 A1 | 4/2009 | King et al. |
| 2009/0160646 A1 | 6/2009 | Mackenzie et al. |
| 2009/0298589 A1 | 12/2009 | van der Burgt et al. |
| 2009/0322510 A1 | 12/2009 | Berger et al. |
| 2010/0003442 A1 | 1/2010 | Even et al. |
| 2010/0032066 A1 | 2/2010 | Nakao et al. |
| 2010/0060459 A1 | 3/2010 | Stole et al. |
| 2010/0087983 A1 | 4/2010 | Boss et al. |
| 2010/0156640 A1 | 6/2010 | Forster |
| 2010/0171604 A1 | 7/2010 | Heller et al. |
| 2010/0199090 A1 | 8/2010 | Berbain et al. |
| 2010/0222939 A1 | 9/2010 | Namburu et al. |
| 2010/0235307 A1 | 9/2010 | Sweeney et al. |
| 2011/0000970 A1 | 1/2011 | Abraham |
| 2011/0012723 A1 | 1/2011 | Adamson et al. |
| 2011/0017832 A1 | 1/2011 | Ritamaki et al. |
| 2011/0021689 A1 | 1/2011 | Schellekens et al. |
| 2011/0107102 A1 | 5/2011 | Canard et al. |
| 2011/0164748 A1 | 7/2011 | Kohlert et al. |
| 2011/0178999 A1 | 7/2011 | Banatre et al. |
| 2011/0198401 A1 | 8/2011 | Tucker et al. |
| 2011/0213664 A1 | 9/2011 | Osterhout et al. |
| 2011/0228974 A1 | 9/2011 | King |
| 2011/0249815 A1 | 10/2011 | Robshaw et al. |
| 2011/0282476 A1 | 11/2011 | Hegemier et al. |
| 2011/0307353 A1 | 12/2011 | Ringl et al. |
| 2012/0024160 A1 | 2/2012 | van Os et al. |
| 2012/0150550 A1 | 6/2012 | Belady et al. |
| 2013/0107042 A1 | 5/2013 | Forster |
| 2013/0152836 A1 | 6/2013 | Deppermann et al. |
| 2013/0157729 A1 | 6/2013 | Tabe |
| 2013/0187755 A1 | 7/2013 | Rogers et al. |
| 2013/0196032 A1 | 8/2013 | Ford et al. |
| 2013/0199704 A1 | 8/2013 | Damon |
| 2013/0218411 A1 | 8/2013 | Drewes |
| 2013/0263958 A1 | 10/2013 | Vinoy |
| 2014/0009267 A1 | 1/2014 | Bracq et al. |
| 2014/0012765 A1 | 1/2014 | Kruglick |
| 2014/0042657 A1 | 2/2014 | Mulliken |
| 2014/0235125 A1 | 8/2014 | Doisneau et al. |
| 2015/0239306 A1 | 8/2015 | Bracq et al. |
| 2016/0107490 A1 | 4/2016 | Randall et al. |
| 2017/0361663 A1 | 12/2017 | Stuckey |
| 2018/0214167 A1 | 8/2018 | Overmyer et al. |

FOREIGN PATENT DOCUMENTS

| | | |
|---|---|---|
| BR | PI1003407 | 10/2011 |
| CN | 1915647 | 2/2007 |

(56) References Cited

FOREIGN PATENT DOCUMENTS

| | | |
|---|---|---|
| CN | 2904127 | 5/2007 |
| CN | 101553373 | 10/2009 |
| CN | 101802850 | 8/2010 |
| CN | 201918110 | 8/2011 |
| CN | 101993672 | 11/2012 |
| CN | 101823413 | 5/2013 |
| CN | 103903049 | 7/2014 |
| CN | 203825654 | 9/2014 |
| CN | 103022644 | 2/2015 |
| CN | 103341941 | 9/2015 |
| DE | 102006049468 | 4/2008 |
| DE | 10357467 | 5/2008 |
| DE | 102005032014 | 3/2009 |
| DE | 102009015327 | 9/2010 |
| DE | 102009032955 | 1/2011 |
| DE | 102009043267 | 4/2011 |
| DE | 102011054154 | 4/2013 |
| DE | 112012004781 | 8/2014 |
| EP | 1539509 | 1/2007 |
| EP | 1748376 | 1/2007 |
| EP | 1746536 | 10/2007 |
| EP | 1692671 | 2/2008 |
| EP | 2037398 | 3/2009 |
| EP | 2040203 | 3/2009 |
| EP | 1580041 | 5/2009 |
| EP | 1615784 | 1/2011 |
| EP | 2061018 | 2/2012 |
| EP | 1946252 | 8/2012 |
| EP | 2182576 | 5/2013 |
| EP | 2759419 | 7/2014 |
| EP | 2329953 | 11/2014 |
| EP | 2420957 | 1/2015 |
| EP | 2901374 | 8/2015 |
| EP | 2223814 | 5/2017 |
| EP | 3206895 | 8/2017 |
| EP | 2172878 | 12/2017 |
| EP | 3252679 | 12/2017 |
| EP | 1914672 | 2/2018 |
| EP | 2530625 | 3/2018 |
| EP | 3136299 | 11/2018 |
| EP | 3411834 | 12/2018 |
| EP | 1926060 | 4/2019 |
| FR | 2890764 | 3/2008 |
| FR | 2912235 | 8/2008 |
| FR | 2911783 | 2/2012 |
| FR | 2964220 | 5/2013 |
| FR | 2971469 | 7/2013 |
| GB | 2469326 | 10/2010 |
| IN | 4578CHENP2006 | 6/2007 |
| JP | 48-038384 | 6/1973 |
| JP | 1977-040100 | 3/1977 |
| JP | 1982-070709 | 5/1982 |
| JP | 1985-187539 | 9/1985 |
| JP | 1995-306642 | 11/1995 |
| JP | 2000-221884 | 8/2000 |
| JP | 2002-244561 | 8/2002 |
| JP | 2005-216077 | 8/2005 |
| KR | 2009-0002353 | 3/2009 |
| NO | 20093288 | 1/2011 |
| NZ | 550096 | 7/2008 |
| TW | M274282 Y | 9/2005 |
| WO | 2006/041514 | 4/2006 |
| WO | 2006/068811 | 6/2006 |
| WO | 2006/071227 | 7/2006 |
| WO | 2007/065196 | 6/2007 |
| WO | 2007/071354 | 6/2007 |
| WO | 2007/081519 | 7/2007 |
| WO | 2008/066978 | 6/2008 |
| WO | 2008/132287 | 11/2008 |
| WO | 2008/142281 | 11/2008 |
| WO | 2010/037941 | 4/2010 |
| WO | 2011/131256 | 10/2011 |
| WO | 2012/007702 | 1/2012 |
| WO | 2012/110702 | 8/2012 |
| WO | 2013/006562 | 1/2013 |
| WO | 2013/017627 | 2/2013 |
| WO | 2013/093373 | 6/2013 |
| WO | 2013/160611 | 10/2013 |
| WO | 2013/190189 | 12/2013 |
| WO | 2014/072667 | 5/2014 |
| WO | 2014/078418 | 7/2015 |
| WO | 2017/127584 | 7/2017 |
| WO | 2018/076731 | 5/2018 |

OTHER PUBLICATIONS

International Search Report and Written Opinion issued in corresponding International Application No. PCT/US2015/052776 dated Jan. 11, 2016.

International Preliminary Report on Patentability issued in corresponding International Application No. PCT/US2015/052776 dated Apr. 4, 2017.

Lee, "A study on the change of physical properties of elastomer in high temperature curing," Journal of the Korean Institute of Rubber Industry, vol. 19, No. 3, 1984.

TIRE TRACKING RFID LABEL

CROSS-REFERENCE TO RELATED APPLICATIONS

The present application is a continuation of U.S. patent application Ser. No. 17/243,692, filed Apr. 29, 2021, which is a continuation of U.S. patent application Ser. No. 16/773,189, filed Jan. 27, 2020, now U.S. Pat. No. 10,997,487, which is a continuation of U.S. patent application Ser. No. 16/181,430 filed Nov. 6, 2018, now U.S. Pat. No. 10,586,144, which is a continuation of U.S. patent application Ser. No. 15/514,504 filed Mar. 25, 2017, now U.S. Pat. No. 10,152,672, which is a 371 of International Application No. PCT/US2015/052776, which was published in English on Apr. 7, 2016, and claims the benefit of U.S. Provisional Patent Application Nos. 62/056,920 filed Sep. 29, 2014 and 62/072,806 filed Oct. 30, 2014, all of which are incorporated herein by reference in their entireties.

FIELD

The present subject matter relates to labels including electronic identification provisions. The labels can be applied to, or incorporated within, rubber-based articles prior to being subjected to heat treatment such as vulcanization. The present subject matter also relates to rubber-based articles including such labels. Additionally, the present subject matter relates to various methods of producing the articles and methods of using such labels and articles.

BACKGROUND

Inventory control and monitoring the distribution and manufacture of articles typically involves providing identification of the articles of interest. A common practice in many fields is to apply labels to articles in which the labels contain identifiers or other information which can thus be associated with the article.

Labeling tires and other rubber-based articles can be problematic, particularly if the labelling is to occur prior to fabrication or before production is complete. Tires and a wide array of other rubber-based articles are subjected to one or more vulcanization operations in which the tire or tire components are fused or molded together. Vulcanization also modifies the rubber-based composition by forming an extensive network of crosslinks within the rubber matrix, thereby significantly increasing the strength and durability of the article.

Although numerous vulcanization techniques are known, many depending upon the type of curing system in the rubber composition, nearly all techniques include application of high pressure and elevated temperatures to the "green," i.e., unvulcanized, rubber-based article.

In view of these and other concerns, adhesive labels have been developed which can be applied to green rubber-based articles such as tires, and which can endure the relatively high temperatures and pressures associated with vulcanization. Although satisfactory in many respects, a need remains for alternative article identification provisions and strategies for tracking articles and particularly tires, during production, distribution, inventory, and rubber product lifetime.

SUMMARY

The difficulties and drawbacks associated with previous approaches are addressed in the present subject matter as follows.

In one aspect, the present subject matter provides a tire tracking label comprising at least one face layer. The label also comprises optionally, at least one primer layer. And, the label also comprises at least one adhesive layer. And, the label additionally comprises at least one RFID component.

In another aspect, the present subject matter provides a labeled rubber-based article comprising a rubber-based article, and a label including at least one face layer, optionally at least one primer layer, at least one adhesive layer, and at least one RFID component. The label is affixed to the article.

In still another aspect, the present subject matter also provides a method of identifying a rubber-based article. The method comprises providing a rubber-based article. The method also comprises providing a label including at least one face layer, optionally at least one primer layer, at least one adhesive layer, and at least one RFID component. And, the method comprises affixing the label with the rubber-based article.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Figure 1:
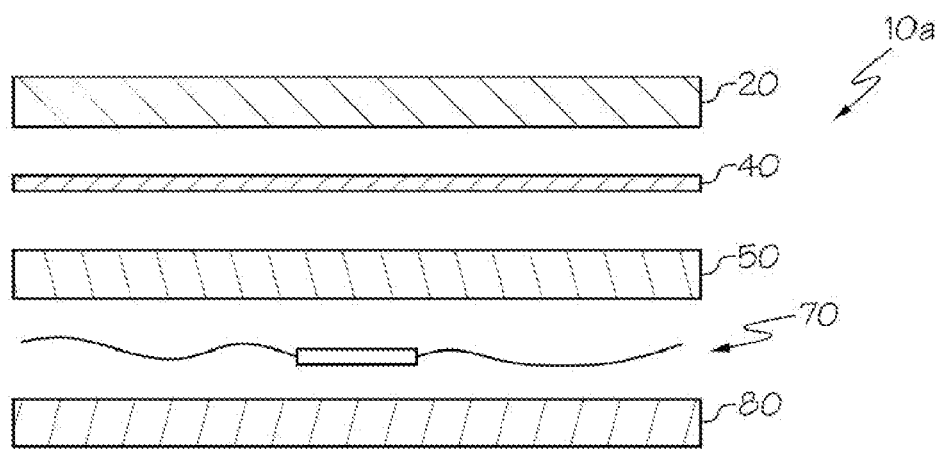
FIG. 1 is a schematic exploded view of an embodiment of a tire tracking label in accordance with the present subject matter.

The present subject matter provides various tire tracking labels that include electronic identification provisions such as for example radio frequency identification (RFID) devices incorporated in the labels. The labels are configured to withstand pressures and temperatures associated with a wide variety of vulcanization processes. The present subject matter also provides tires and other rubber-based articles that include the tire tracking labels. Additionally, the present subject matter provides methods of forming the tires and other rubber-based articles which include the noted labels. Furthermore, the present subject matter provides methods of identifying and/or tracking one or more tires or other rubber-based articles having the noted labels. These and other aspects are all described herein.

The labels of the present subject matter comprise one or more face layer(s) or layer(s) of facestock material, optionally one or more layer(s) of primer disposed on the face layer(s), one or more layer(s) of adhesive, one or more RFID chips or components, and optionally one or more release liner(s). The present subject matter includes various combinations of these components and utilizing particular layering or arrangement of components, all of which are described in greater detail herein.

The labels can be applied to one or more surfaces of a rubber-based article such as a tire inner side wall and/or a tire outer side wall. The labels can also be embedded or otherwise incorporated within a rubber-based article such that the label is entirely or partially hidden from view. Although the present subject matter will find wide application in manufacture, distribution, and/or inventory of tires, the present subject matter can also be utilized in conjunction with other rubber-based articles such as rubber suspension components, rubber cushions, rubber damping components, and other rubber-based articles. Thus, although the labels are generally referred to herein as "tire tracking labels," it will be understood that the present subject matter is not limited to use with tires, and instead can be utilized with a wide array of other articles and particularly rubber-based articles that are vulcanized.

The labels utilize materials and are configured such that the labels can withstand the relatively high pressures and/or temperatures of many vulcanization processes. Thus, the labels can be applied to and/or incorporated with green rubber-based articles. These and other aspects and details are as follows.

Labels
Face Layers

The labels of the present subject matter comprise one or more layers of a face material, also known as facestock. In certain embodiments the face material can withstand conditions typically associated with a "cold vulcanization" without face layer degradation. The term "cold vulcanization" as used herein refers to heating to a temperature greater than 90° C. and up to 170° C. for a time period of at least 10 minutes. Nonlimiting examples of suitable materials for face layers that can endure cold vulcanization include polyolefins, polyethylene terephthalate (PET), polyamids (PA), polyimides (PI), polyethylene naphthalate (PEN), cotton, paper, fiberglass, synthetic textiles, and combinations thereof. The present subject matter includes the use of other face materials so long as such materials can endure cold vulcanization. Typically, such other materials have melting points greater than 90° C.

In particular embodiments the face material can withstand conditions typically associated with a "warm vulcanization" without face layer degradation. The term "warm vulcanization" as used herein refers to heating to a temperature greater than 170° C. for a time period of at least 10 minutes. Nonlimiting examples of suitable materials for face layers that can endure warm vulcanization include polypropylene (PP), polyethylene terephthalate (PET), polyamides (PA), polyimides (PI), polyethylene naphthalate (PEN), cotton, paper, fiberglass, synthetic textiles, and other materials exhibiting a melting point greater than 170° C.

The one or more face layers can be in film form, woven fibrous form, and/or nonwoven fibrous form. The present subject matter includes combinations of face layers in film, woven, and/or nonwoven forms.

Primer Layers

The labels of the present subject matter comprise one or more layers of primer. In certain embodiments, the primer is applied to one or both sides of a face layer. If multiplied face layers are used, the primer can be applied to one or some or all faces of the face layers. The primer layer(s) can be applied to portion(s) of a face or side of the face layers. In certain embodiments, multiple layers such as two layers of primer are used.

The primer layers are optional and their use in the present subject matter labels primarily depends upon the face layer(s). For example, if a film face layer is used, then in many embodiments primer is applied to that film face. However, for certain face layers such as those formed from woven or nonwoven materials for example paper or cotton materials, the label may be free of primer.

In certain embodiments, a particular primer composition is used for application to, and contact with, polymeric films such as PET. Such primer compositions include solvent-based primers which comprise reactive polymers in a solvent such as methyl isobutyl ketone (MIBK). An example of such primer which is commercially available is THIXON P-11 from Dow Chemical.

In certain embodiments, particular primer compositions are used for application to, and contact with, adhesive layers. Such primer compositions include solvent-based vulcanizing adhesives for bonding rubber compounds to substrates during vulcanization. Such primer compositions include reactive polymers in solvents such as xylene. An example of such primer which is commercially available is THIXON 520 also known as THIXON 520-PEF, from Dow Chemical.

In no way is the present subject matter limited to any of the primers noted herein. Instead, the present subject matter can utilize nearly any primer which can endure vulcanization.

Adhesive

The labels of the present subject matter comprise one or more layers of adhesive. In many embodiments, the labels utilize multiple adhesive layers such as two layers or three layers. The adhesive is selected such that the adhesive can (i)

adhere to a surface of a green rubber-based article prior to the article undergoing vulcanization, (ii) withstand conditions of vulcanization without adhesive degradation, and (iii) exhibit long term durability and resistance to a host of environmental factors. An example of such an adhesive which is commercially available is Adhesive TS8017 from Avery Dennison. The TS8017 adhesive co-vulcanizes with a rubber surface of a green rubber-based article during vulcanization of the article. After vulcanization, the TS8017 adhesive forms a permanent bond with vulcanized rubber after the vulcanization process is completed. Thus, upon application of the label to a surface of a tire or other rubber article, the adhesive layer can form a permanent bond with the tire or article. If the label is incorporated within or embedded within a tire or other rubber article, the adhesive layer can form a permanent bond within the rubber layers or the rubber article or tire. If the label is applied to a surface of a tire such as an interior side wall or exterior side wall of a tire, the adhesive layer can form a permanent bond with the noted surface(s). These permanent affixment strategies are such that the label remains intact and adhered to or within the tire or article through the lifetime of the tire or other rubber article.

In many embodiments, the adhesive comprises unsaturated rubber. The unsaturated rubber can crosslink with rubber in a tire or other rubber-based article and thereby form a permanent bond. The noted crosslinking occurs or at least primarily occurs during vulcanization of the tire or rubber-based article.

In particular embodiments, the adhesive is a heat-activated adhesive. The adhesive is selected such that the heat activation temperature of the adhesive corresponds to the particular vulcanization process to which the tire or rubber-based article will be subjected. For example, if a tire is to be subjected to cold vulcanization, a heat-activated adhesive having a heat activation temperature within a range of 90° C. to 170° C. could be used. Alternatively, if a tire is to be subjected to warm vulcanization, a heat-activated adhesive having a heat activation temperature greater than 170° C. could be used.

In certain versions of the present subject matter, the adhesive comprises two or more phases and exhibits multiple stages. For example, a multiphase adhesive exhibiting pressure sensitive adhesive (PSA) characteristics at a first stage, and an activated second stage occurring upon heating or exposing the adhesive to radiation, could be used. The adhesive can exhibit permanent adhesive characteristics at or after heating or exposure to radiation. Thus, the present subject matter includes the use of a wide array of multiphase and/or multistage adhesives.

In particular embodiments, the adhesive can be an acrylic adhesive, a rubber-acrylic based hybrid, or combinations of these so long as the adhesive can withstand the conditions associated with the vulcanization process to be used.

In certain versions, the adhesive includes agents such as particular polymers and/or oligomers that include reactive side groups or side chains, i.e., chemical moieties, which can form permanent bonds with a rubber surface as a result of vulcanization of the tire or rubber-based article with which the label is associated.

RFID Component(s)

The labels of the present subject matter comprise one or more RFID component(s) and/or device(s). A typical RHO device generally includes an antenna for wirelessly transmitting and/or receiving RF signals and analog and/or digital electronics operatively connected thereto. So called active or semi-passive RHO devices may also include a battery or other suitable power source. Commonly, the electronics are implemented via an integrated circuit (IC) or microchip or other suitable electronic circuit and may include, e.g., communications electronics, data memory, control logic, etc. In operation, the IC or microchip functions to store and/or process information, modulate and/or demodulate RF signals, as well as optionally performing other specialized functions. In general, RHO devices can typical retain and communicate enough information to uniquely identify individuals, packages, inventory and/or other like objects, e.g., to which the RFID device is affixed.

Commonly, an RFID reader or base station is used to wirelessly obtain data or information (e.g., such as an identification code) communicated from an RFID device. Typically, an RFID device is configured to store, emit, or otherwise exhibit an identification code or other identifier(s). The manner in which the RFID reader interacts and/or communicates with the RHO device generally depends on the type of RHO device. A given RFID device is typically categorized as a passive device, an active device, a semi-passive device (also known as a battery-assisted or semi-active device) or a beacon type RHO device (which is generally considered as a sub-category of active devices). Passive RHO devices generally use no internal power source, and as such, they are passive devices which are only active when an RFID reader is nearby to power the RFID device, e.g., via wireless illumination of the RHO device with an RF signal and/or electromagnetic energy from the RFID reader. Conversely, semi-passive and active RFID devices are provided with their own power source (e.g., such as a small battery). To communicate, conventional RFID devices (other than so called beacon types) respond to queries or interrogations received from RFID readers. The response is typically achieved by backscattering, load modulation and/or other like techniques that are used to manipulate the RFID reader's field. Commonly, backscatter k used in far-field applications (i.e., where the distance between the RFID device and reader is greater than approximately a few wavelengths), and alternately, load modulation k used in near-field applications (i.e., where the distance between the RFID device and reader is within approximately a few wavelengths).

Passive RFID devices typically signal or communicate their respective data or information by backscattering a carrier wave from an RFID reader. That is, in the case of conventional passive RFID devices, in order to retrieve information therefrom, the RFID reader typically sends an excitation signal to the RFID device. The excitation signal energizes the RFID device which transmits the information stored therein back to the RFID reader. In turn, the RFID reader receives and decodes the information from the RFID device.

As previously noted, passive RFID devices commonly have no internal power supply. Rather, power for operation of a passive RFID device is provided by the energy in the incoming RF signal received by the RFID device from the RFID reader. Generally, a small electrical current induced in the antenna of the RFID device by the incoming RF signal provides sufficient power for the IC or microchip in the RFID device to power up and transmit a response. This means that the antenna generally has to be designed both to collect power from the incoming signal and also to transmit the outbound backscatter signal.

Passive RFID devices have the advantage of simplicity and long life (e.g., having no battery to go dead). Nevertheless, their performance may be limited. For example, passive RFID devices generally have a more limited range as compared to active RFID devices.

Active RFID devices, as opposed to passive ones, are generally provisioned with their own transmitter and a power source (e.g., a battery, photovoltaic cell, etc.). In essence, an active RFID device employs the self-powered transmitter to broadcast a signal which communicates the information stored on the IC or microchip in the RFID device. Commonly, an active RFID device will also use the power source to power the IC or microchip employed therein.

Generally, there are two kinds of active RFID devices— one can be considered as a transponder type of active RFID device and the other as a beacon type of active RFID device. A significant difference is that active transponder type RFID devices are only woken up when they receive a signal from an RFID reader. The transponder type RFID device, in response to the inquiry signal from the RFID reader, then broadcasts its information to the reader. As can be appreciated, this type of active RFID device conserves battery life by having the device broadcast its signal only when it is within range of a reader. Conversely, beacon type RFID devices transmit their identification code and/or other data or information autonomously (e.g., at defined intervals or periodically or otherwise) and do not respond to a specific interrogation from a reader.

Generally, active RHO devices, due to their on-board power supply, may transmit at higher power levels (e.g., as compared to passive devices), allowing them to be more robust in various operating environments. However, the battery or other on-board power supply can tend to cause active RHO devices to be relatively larger and/or more expensive to manufacture (e.g., as compared to passive devices). Additionally, as compared to passive RHO devices, active RHO devices have a potentially more limited shelf due to the limited lifespan of the battery. Nevertheless, the self supported power supply commonly permits active RHO devices to include generally larger memories as compared to passive devices, and in some instances the on-board power source also allows the active device to include additional functionality, e.g., such as obtaining and/or storing environmental data from a suitable sensor.

Semi-passive RHO devices are similar to active devices in that they are typically provisioned with their own power source, but the battery commonly only powers the IC or microchip and does not provide power for signal broadcasting. Rather, like passive RHO devices, the response from the semi-passive RHO device is usually powered by means of backscattering the RF energy received from the RFID reader, i.e., the energy is reflected back to the reader as with passive devices. In a semi-passive RHO device, the battery also commonly serves as a power source for data storage.

A conventional RHO device will often operate in one of a variety of frequency ranges including, e.g., a low frequency (LF) range (i.e., from approximately 30 kHz to approximately 300 kHz), a high frequency (HF) range (i.e., from approximately 3 MHz to approximately 30 MHz) and an ultra-high frequency (UHF) range (i.e., from approximately 300 MHz to approximately 3 GHz). A passive device will commonly operate in any one of the aforementioned frequency ranges. In particular, for passive devices: LF systems commonly operate at around 124 kHz, 125 kHz or 135 kHz; HF systems commonly operate at around 13.56 MHz; and, UHF systems commonly use a band anywhere from 860 MHz to 960 MHz. Alternately, some passive device systems also use 2.45 GHz and other areas of the radio spectrum. Active RFID devices typically operate at around 455 MHz, 2.45 GHz, or 5.8 GHz. Often, semi-passive devices use a frequency around 2.4 GHz.

The read range of an RHO device (i.e., the range at which the RFID reader can communicate with the RHO device) is generally determined by many factors, e.g., the type of device (i.e., active, passive, etc.). Typically, passive LF RHO devices (also referred to as LFID or LowFID devices) can usually be read from within approximately 12 inches (0.33 meters); passive HF RHO devices (also referred to as HFID or HighFID devices) can usually be read from up to approximately 3 feet (1 meter); and passive UHF RHO devices (also referred to as UHFID devices) can be typically read from approximately 10 feet (3.05 meters) or more. One important factor influencing the read range for passive RFID devices is the method used to transmit data from the device to the reader, i.e., the coupling mode between the device and the reader—which can typically be either inductive coupling or radiative/propagation coupling. Passive LFID devices and passive HFID devices commonly use inductive coupling between the device and the reader, whereas passive UHFID devices commonly use radiative or propagation coupling between the device and the reader.

In inductive coupling applications (e.g., as are conventionally used by passive LFID) and HFID devices), the device and reader are typically each provisioned with a coil antenna that together form an electromagnetic field therebetween. In inductive coupling applications, the device draws power from the field, uses the power to run the circuitry on the device's IC or microchip and then changes the electric load on the device antenna. Consequently, the reader antenna senses the change or changes in the electromagnetic field and converts these changes into data that is understood by the reader or adjunct computer. Because the coil in the device antenna and the coil in the reader antenna have to form an electromagnetic field therebetween in order to complete the inductive coupling between the device and the reader, the device often has to be fairly close to the reader antenna, which therefore tends to limit the read range of these systems.

Alternately, in radiative or propagation coupling applications (e.g., as are conventionally used by passive UHFID devices), rather than forming an electromagnetic field between the respective antennas of the reader and device, the reader emits electromagnetic energy which illuminates the device. In turn, the device gathers the energy from the reader via its antenna, and the device's IC or microchip uses the gathered energy to change the load on the device antenna and reflect back an altered signal, i.e., backscatter. Commonly, UHFID devices can communicate data in a variety of different ways, e.g., they can increase the amplitude of the reflected wave sent back to the reader (i.e., amplitude shift keying), shift the reflected wave so it is out of phase received wave (i.e., phase shift keying) or change the frequency of the reflected wave (i.e., frequency shift keying). In any event, the reader picks up the backscattered signal and converts the altered wave into data that is understood by the reader or adjunct computer.

The antenna employed in an RHO device is also commonly affected by numerous factor, e.g., the intended application, the type of device (i.e., active, passive, semi-active, etc.), the desired read range, the device-to-reader coupling mode, the frequency of operation of the device, etc. For example, insomuch as passive LFID devices are normally inductively coupled with the reader, and because the voltage induced in the device antenna is proportional to the operating frequency of the device, passive LFID devices are typically provisioned with a coil antenna having many turns in order to produce enough voltage to operate the device's IC or microchip. Comparatively, a conventional HFID passive device will often be provisioned with an antenna which is a planar spiral (e.g., with 5 to 7 turns over a credit-card-sized form factor), which can usually provide read ranges on the order of tens of centimeters. Commonly, HFID antenna coils can be less costly to produce (e.g., compared to LFID antenna coils), since they can be made using techniques relatively less expensive than wire winding, e.g., lithography or the like. UHFID passive devices are usually radiatively and/or propagationally coupled with the reader antenna and consequently can often employ conventional dipole-like antennas.

The labels of the present subject matter can utilize any of the noted RFID devices. In many embodiments, the RFID device is a passive device.

Additional details of RFID devices, components, and their use are described in one or more of the following US Patents or Published Patent Applications: 7,479,888; 2011/0000970; 7,786,868; 7,298,330; 8,633,821; 7,368,032; and 2013/0107042.

Liners

A wide array of release liners can be utilized in the present subject matter labels. Release liners are well known and described in the prior art. Nonlimiting examples of liners include a supercalendered glassine (BG) liner, and a PET liner. The liner(s) cover the adhesive face(s) of the label and are typically removed prior to use or application of the label to the tire or article. In many embodiments, multiple release liners are used such as for example two release liners.

Tires

The present subject matter labels can be affixed to and/or incorporated within a wide array of tires. As will be appreciated, tires are typically used in combination with rims of a vehicle. The rubber-based tire provides support and gripping for the vehicle with a road or ground surface. The labels can be used with bias tires, belted bias tires, radial tires, solid tires, semi-pneumatic tires, pneumatic tires, and airless tires. The labels of the present subject matter can be used in association with nearly any type of tire. Generally all tires include an outer tread, a bead which contacts a rim upon installation of the tire, and sidewalls that extend between the tread and bead.

Other Rubber-Based Articles

As previously noted, the labels of the present subject matter can be used with a wide array of other rubber or rubber-based articles in addition to, or instead of, tires. Nonlimiting examples of other rubber-based articles include suspension components, cushions, shoe soles, hoses, hockey pucks, conveyor belts, musical mouth pieces, bowling balls, and the like. The terms "rubber articles" and "rubber-based articles" are used interchangeably herein.

Methods

Label Affixment

The labels of the present subject matter are affixed to rubber-based articles such as tires. The terms "affix" or "affixed" as used herein refer to attaching or adhering the label(s) by use of their adhesive layer(s), to a surface or region of an article. The terms also include embedding the label(s) within the article such that the label(s) is hidden or at least partially hidden from view in the finished article.

In many embodiments of the present subject matter the label(s) include one or more release liners that cover or protect adhesive layer(s). Upon removal of the release liner(s) to expose the adhesive, the adhesive layer is contacted with a surface of the article. For methods in which the label is embedded within an article, removal of the release liner(s) enables the adhesive layer(s) to bond with the rubber matrix of the article.

In many embodiments, the label(s) are affixed to the article prior to subjecting the article to vulcanization. As described herein, in certain versions of the labels, vulcanization may also result in a permanent bond between the label and the article.

Methods of Using the Labeled Vulcanized Articles

The present subject matter also provides methods of identifying a rubber-based article. The methods involve affixing one or more labels to the rubber-based article. The labels include an RFID component which may be configured to provide a unique identifier or other information upon being read or otherwise interrogated. Once the label is affixed to a rubber-based article, the unique identifier is thus associated with the particular article. The labels can be affixed to the article prior to vulcanization or in certain applications, after vulcanization.

After affixment of one or more labels with an article, the article can be identified by use of an RFID reader as previously described herein. Identification of the article enables a wide array of applications to be performed such as tracking the article in a manufacturing or production system, monitoring the location of the article, and performing inventory operations.

EMBODIMENTS

FIG. 1 illustrates a label 10A in accordance with the present subject matter. The label 10A comprises a face layer 20, one or more primer layers 40, an adhesive layer 50, an RFID component 70, and a liner 80.

Figure 2:
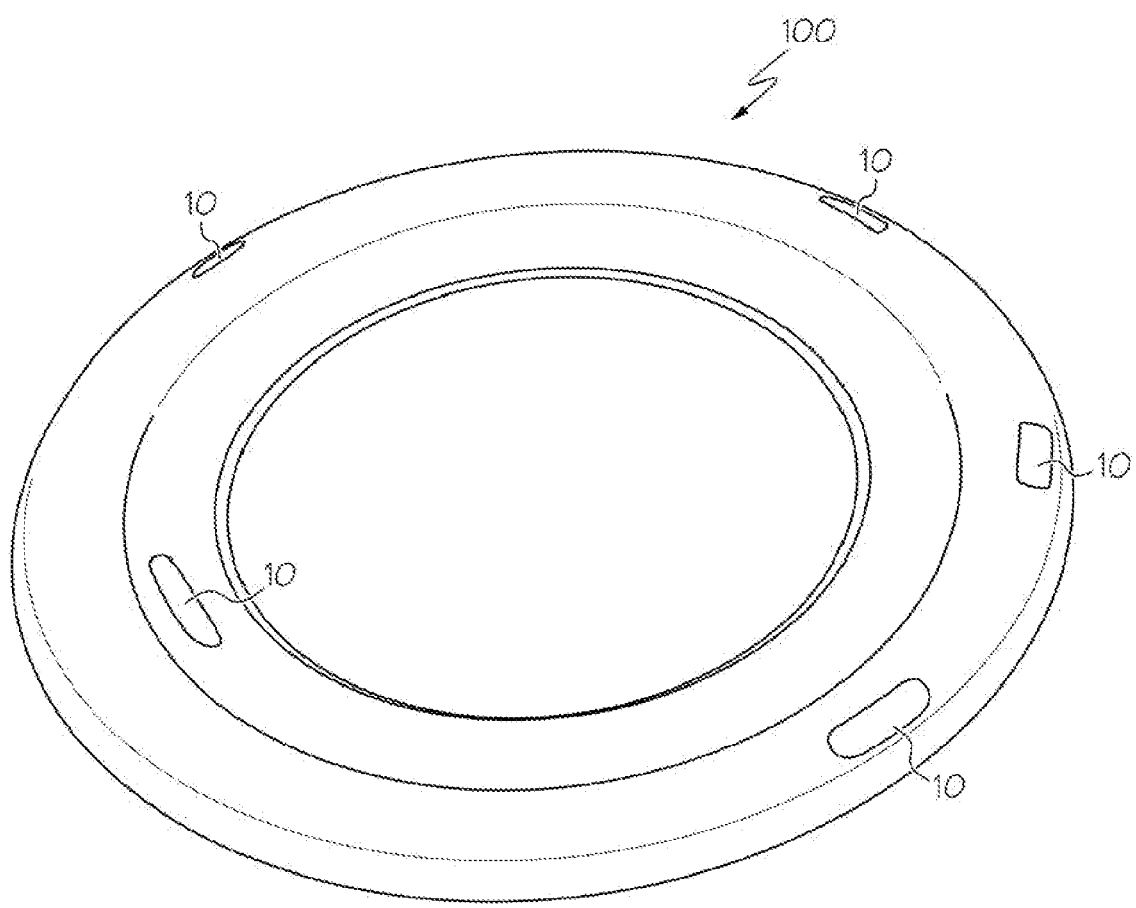
FIG. 2 is an illustration of a tire having a collection of tire tracking labels adhered to an outer wall of the tire in accordance with the present subject matter.

FIG. 2 is a photograph illustrating a plurality of labels 10 as described herein affixed to a sidewall of a tire 100. The one or more label(s) can be applied on an exterior and/or interior face of a sidewall of a tire prior to vulcanization of the tire. The label(s) will vulcanize and bond with the tire surface and form a permanent bond with the rubber substrate.

Figure 3:
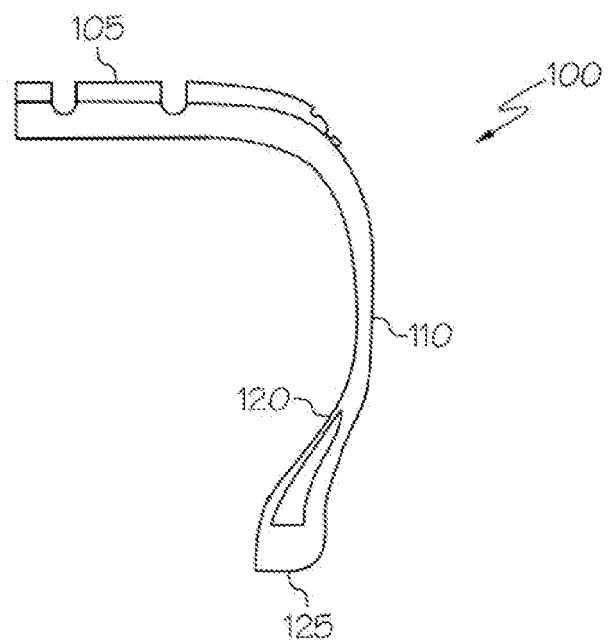
FIG. 3 is a schematic partial cross section of a representative tire illustrating suitable locations for affixing a tire tracking label thereto, in accordance with the present subject matter.

FIG. 3 is a cross section of a tire 100 illustrating a tire tread 105, an outer or exterior sidewall 110, an inner or interior sidewall 120, and a bead 125. As previously described, the labels of the present subject matter can be affixed to any region on the tire and particularly along the exterior sidewall 110 or the interior sidewall 120 of the tire. The labels can also be incorporated or embedded within the tire 100.

Figure 4:
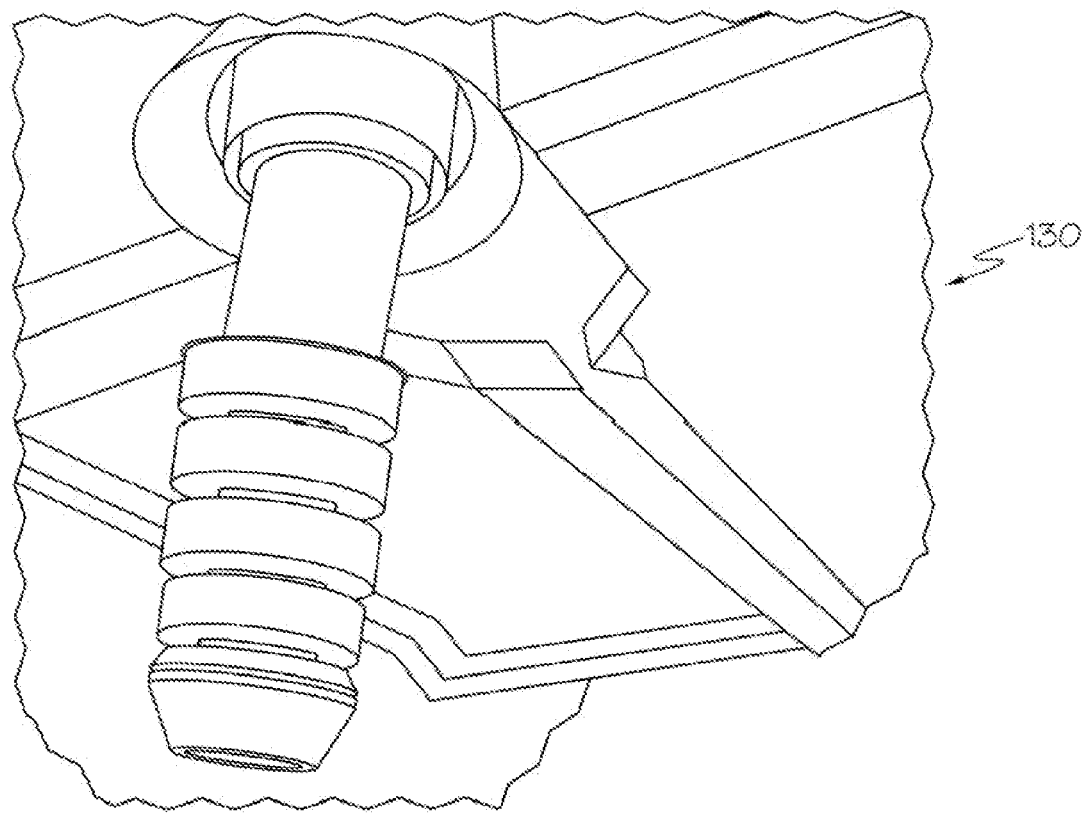
FIG. 4 is an illustration of a rubber-based suspension component that can receive a label in accordance with the present subject matter.

FIG. 4 is a photograph of a rubber-based article 130 in the form of a suspension component. The labels (not shown) of the present subject matter can be incorporated within, embedded within, and/or affixed along a surface of the article 130.

Figure 5:
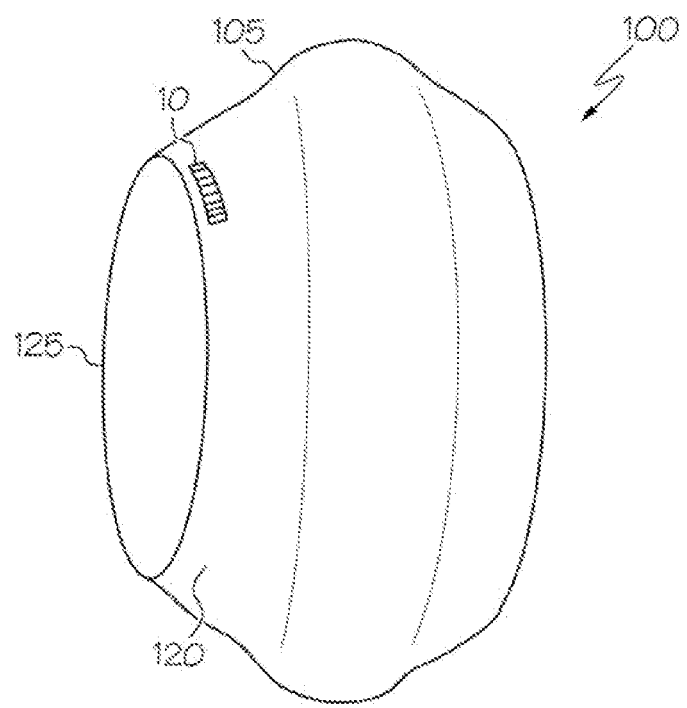
FIG. 5 is a schematic illustration of a green tire (tire before vulcanization) having its interior side walls and interior tread wall exposed, depicting a suitable location for a tire tracking label in accordance with the present subject matter.
Figure 6:
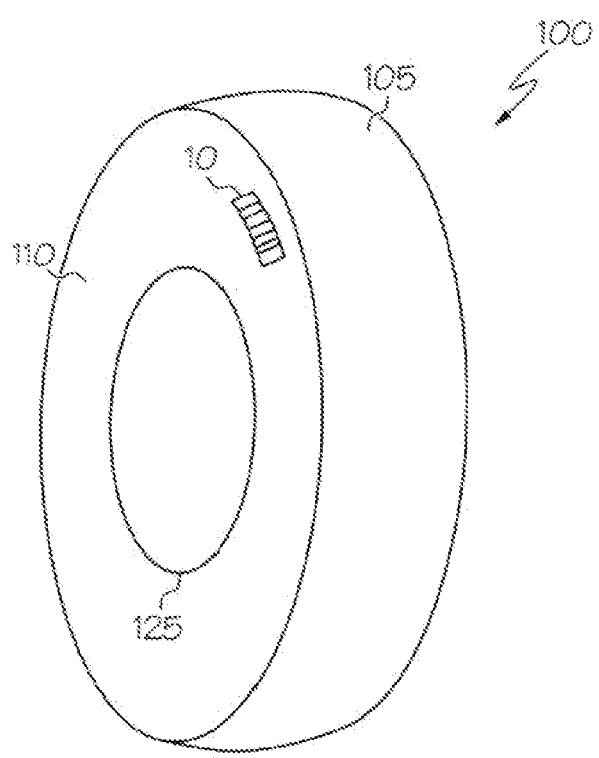
FIG. 6 is a schematic illustration of a green tire (tire before vulcanization) in its typical form in which its exterior side walls and exterior tread face are exposed, depicting another suitable location for a tire tracking label in accordance with the present subject matter.

FIGS. 5 and 6 illustrate a tire 100 having a label 10 affixed thereto. FIGS. 5 and 6 depict the tire 100 having a tread region 105, a bead 125, and a sidewall extending therebetween. FIG. 5 illustrates an inner face 120 of the sidewall and the label 10 affixed thereto. FIG. 6 shows an outer face 110 of the sidewall and the label 10 affixed thereto.

Figure 7:
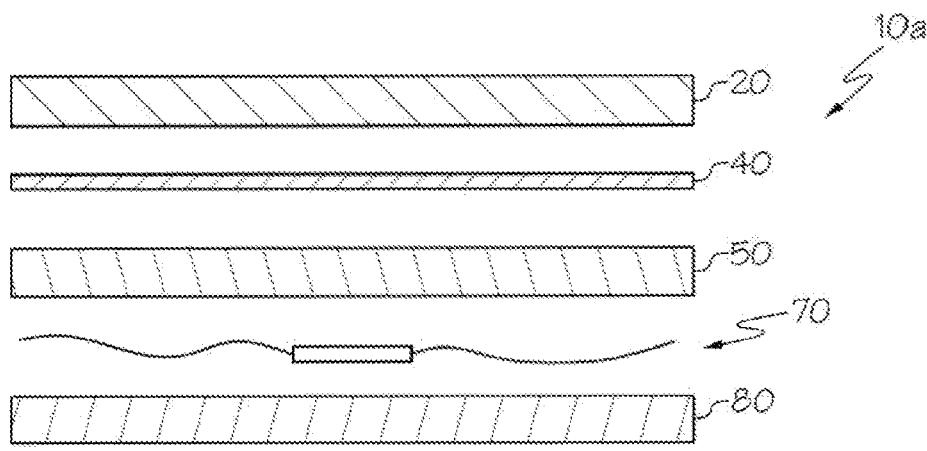
FIG. 7 is a schematic exploded view of a single face layer embodiment of a tire tracking label in accordance with the present subject matter.

FIG. 7 illustrates a particular label embodiment 10A previously shown in FIG. 1. The face layer 20 includes one or more of PET, one or more synthetic textiles, cotton, paper, or polyamide. The primer layer 40 includes two primer layers. The adhesive layer 50 includes the previously described TS8017 adhesive. The RFID component 70 is as previously described. The liner 80 is BG liner or PET liner.

In label 10A, the RFID component 70 is disposed between the adhesive layer 50 and the liner 80.

Figure 8:
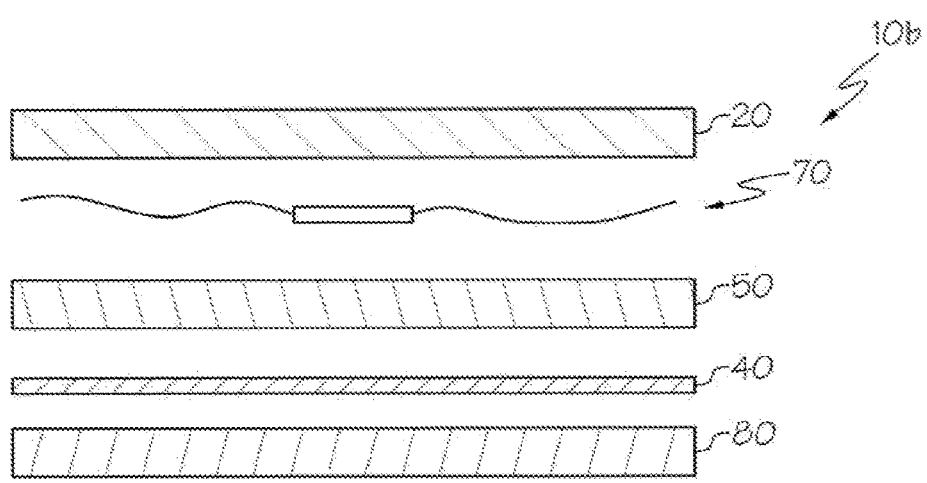
FIG. 8 is a schematic exploded view of another single face layer embodiment of a tire tracking label in accordance with the present subject matter.

FIG. 8 illustrates another label 10B including a face layer 20 which includes one or more of PET, one or more synthetic textiles, cotton, paper or polyamide. The label 10B also comprises an RFID component 70. The RFID component is as previously described. The label 10B also comprises primer layer(s) 40. The primer layer 40 includes two primer layers. Label 10B also comprises an adhesive layer 50. The adhesive layer 50 includes the TS8017 adhesive. Label 10B also comprises a liner 80. The liner 80 is BG liner or PET liner. In label 10B, the RFID component 70 is disposed between the face layer 20 and the primer layers 40.

Figure 9:
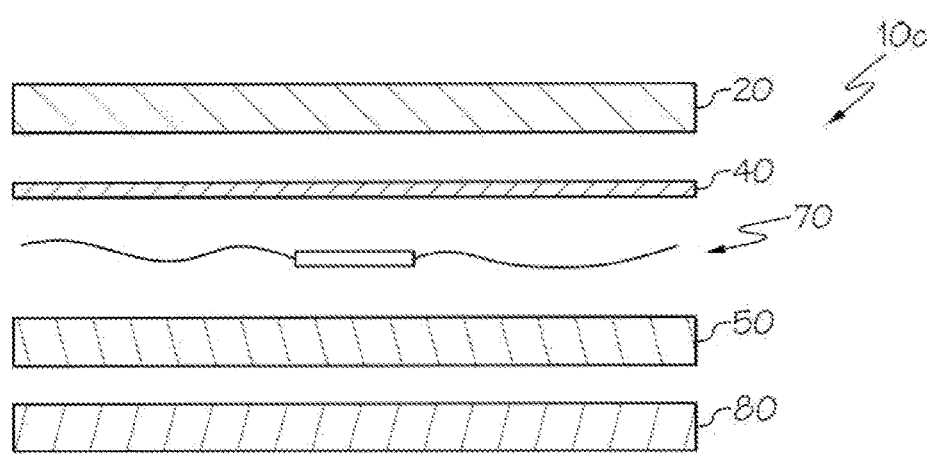
FIG. 9 is a schematic exploded view of still another single face layer embodiment of a tire tracking label in accordance with the present subject matter.

FIG. 9 illustrates another label 10C comprising a face layer 20 that includes one or more of PET, one or more synthetic textiles, cotton, paper, or polyamide. The label 10C also comprises a primer layer 40. The primer layer 40 includes two layers of primer. The label 10C also comprises an RFID component 70. The RFID component 70 is as previously described. The label 10C also comprises an adhesive layer 50. The adhesive layer 50 includes the TS8017 adhesive. The label 10C also comprises a liner 80. The liner 80 is BG liner or PET liner. In label 10C, the RFID component 70 is disposed between the primer layers 40 and the adhesive layer 50.

Figure 10:
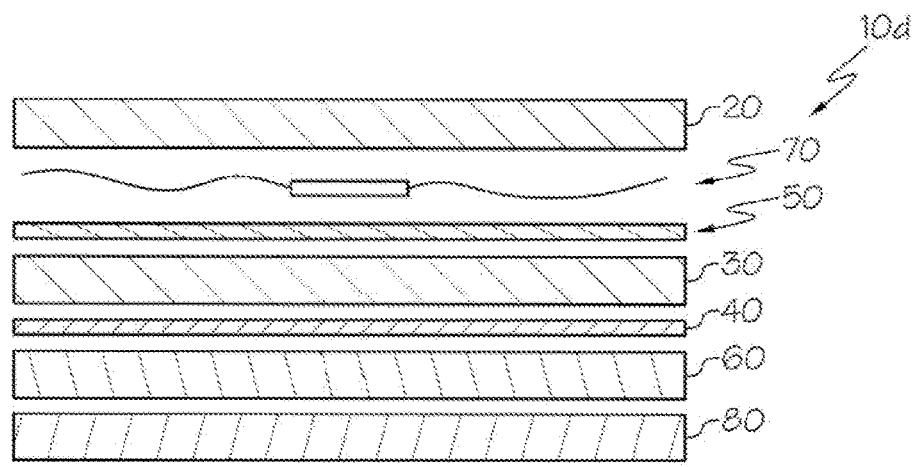
FIG. 10 is a schematic exploded view of a double face layer embodiment of a tire tracking label in accordance with the present subject matter.

FIG. 10 illustrates another label 10D including a first face layer 20 that includes one or more of PET, one or more synthetic textiles, cotton, paper, polyamide. The label 10D also comprises an RFID component 70. The label 10D also includes a first adhesive layer 50 that can be a heat-activated or PSA adhesive or other adhesive. The label 10D also includes a second face layer 30 that can include one or more of PET, one or more synthetic textiles, cotton, paper, or polyamide. The label 10D also comprises two primer layers 40. The label 10D also comprises a second adhesive layer 60 which is the TS8017 adhesive. The label 10D also comprises a BG liner or PET liner.

Figure 11:
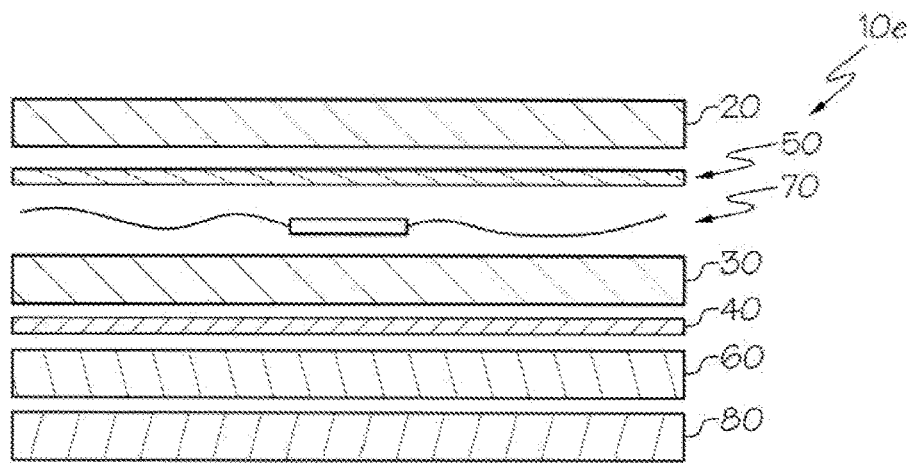
FIG. 11 is a schematic exploded view of another double face layer embodiment of a tire tracking label in accordance with the present subject matter.

FIG. 11 illustrates another label 10E comprising a face material 20 which can be PET, one or more synthetic textiles, cotton, paper, or polyamide. The label 10E also comprises a first adhesive layer 50 which can be a heat-activated adhesive or a PSA or other adhesive. The label 10E also comprises an RFID component 70 as previously described. The label 10E also comprises a second face layer 30 which can include one or more of PET, one or more synthetic textiles, cotton, paper, or polyamide. The label 10E also comprises two primer layers 40. The label 10E also comprises a second adhesive layer 60 that can include the TS8017 adhesive. The label 10E also includes a liner 80 which can be a GB liner or PET liner.

Figure 12:
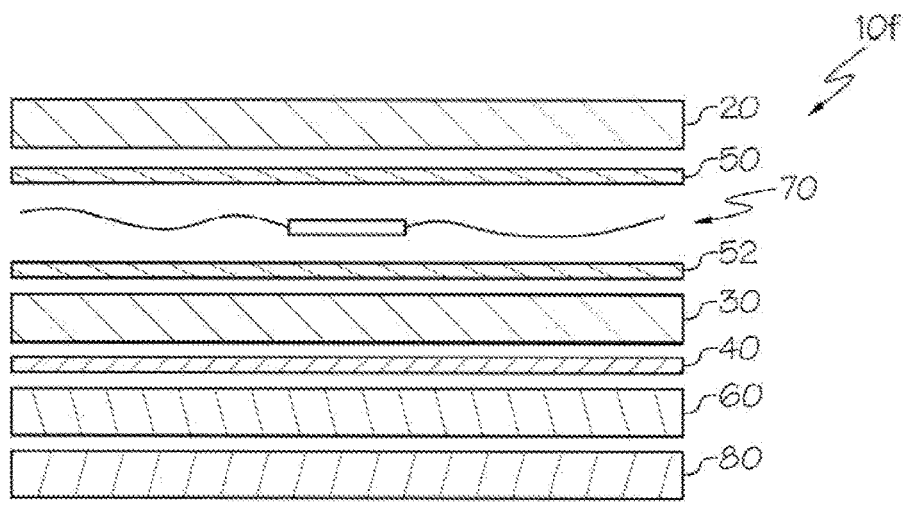
FIG. 12 is a schematic exploded view of still another double face layer embodiment of a tire tracking label in accordance with the present subject matter.

FIG. 12 illustrates another label 10F comprising a face material 20 which can be PET, one or more synthetic textiles, cotton, paper, or polyamide. The label 10F also comprises a first adhesive layer 50 which can be a heat-activated adhesive or a PSA. The label 10F also comprises an RFID component 70 as previously described. The label 10F also comprises another layer of adhesive 52 which can be a heat-activated adhesive or a PSA or other adhesive. The label 10F also comprises a second face layer 30 which can include one or more of PET, one or more synthetic textiles, cotton, paper, or polyamide. The label 10E also comprises two primer layers 40. The label 10F also comprises a third adhesive layer 60 that can include the TS8017 adhesive. The label 10F also includes a liner 80 which can be a GB liner or PET liner.

Figure 13:
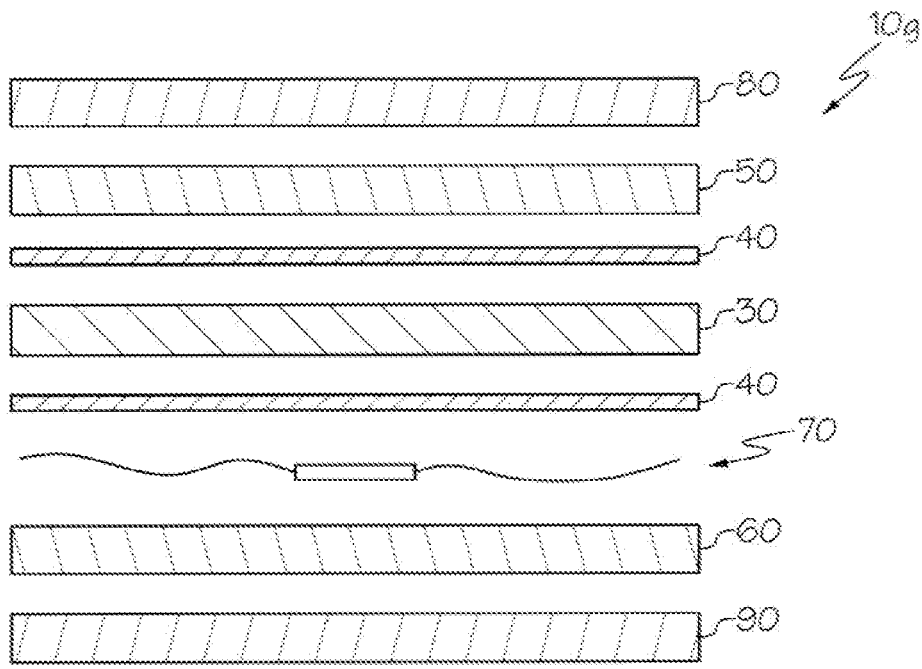
FIG. 13 is a schematic exploded view of a single face layer and a double adhesive layer embodiment of a tire tracking label in accordance with the present subject matter.

FIG. 13 illustrates another label 10G comprising a first liner 80, which can be a BG liner or PET liner. The label 10G also comprises an adhesive layer 50 which can be the previously noted TS8017 adhesive. The label 10G also comprises primer 40 which is generally in the form of two layers of primer. The label 10G also comprises a face layer 30 which can include one or more of PET, one or more synthetic textiles, cotton, paper, or polyamide. The label 10G also comprises primer layer 40 which can include two layers. The label 10G also comprises an RFID component 70. The label 10G also comprises a second layer of adhesive 60 which can be the TS8017 adhesive. And, the label 10G also comprises a second liner 90 which can be a BG liner or PET liner. For applications in which the label is provided in a roll or self wound form, a single double face liner such as a double siliconized liner can be used.

Figure 14:
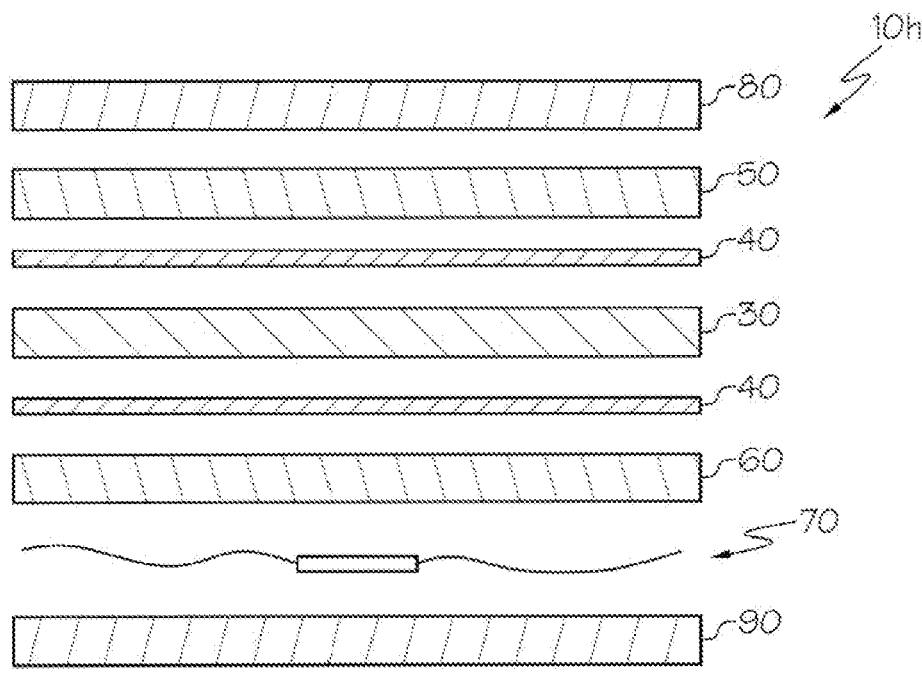
FIG. 14 is a schematic exploded view of another single face layer and a double adhesive layer embodiment of a tire tracking label in accordance with the present subject matter.

FIG. 14 illustrates another label 10H comprising a first liner 80, which can be a BG liner or PET liner. The label 10H also comprises an adhesive layer 50 which can be the previously noted TS8017 adhesive. The label 10H also comprises primer 40 which is generally in the form of two layers of primer. The label 10H also comprises a face layer 30 which can include one or more of PET, one or more synthetic textiles, cotton, paper, or polyamide. The label 10H also comprises primer layer 40 which can include two layers. The label 10H also comprises a second layer of adhesive 60 which can be the TS8017 adhesive. The label 10H also comprises an RFID component 70. And, the label 10H also comprises a second liner 90 which can be a BG liner or PET liner. For applications in which the label is provided in a roll or self wound form, a single double face liner such as a double siliconized liner can be used.

Figure 15:
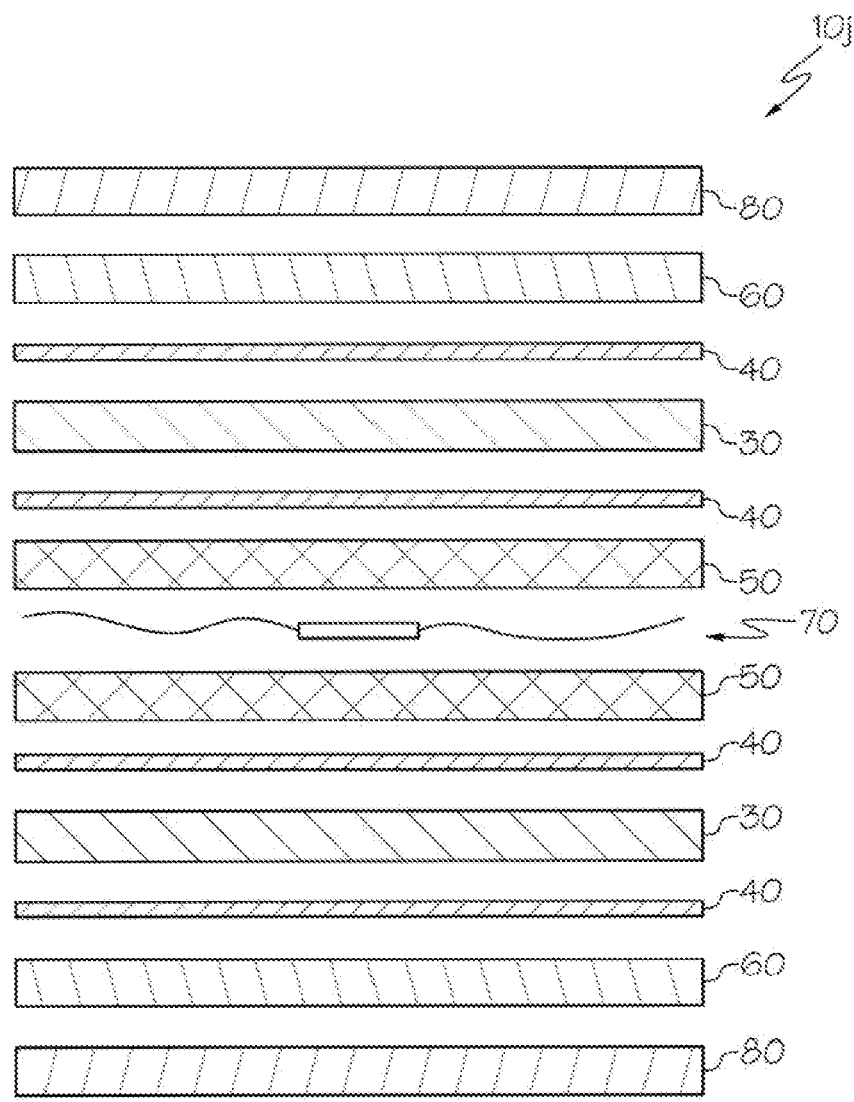
FIG. 15 is a schematic exploded view of still yet another double face layer embodiment of a tire tracking label in accordance with the present subject matter.

FIG. 15 illustrates another label 10J comprising one or more liners 80, which can be a BG liner or PET liner. The label 10J also comprises one or more adhesive layers 60 which can be the previously noted TS8017 adhesive. The label 10J may also comprise one or more primer layer 40 which is generally in the form of two layers of primer. The label 10J also comprises one or more face layers 30 which can include one or more of PET, one or more synthetic textiles, cotton, paper, or polyamide. The label 10J may also comprise one or more additional primer layers 20 The primer layer 20 may be the same as primer layer 40 when vulcanization adhesive TS8017 is utilized for adhesive layers 50 and 60. In the instance when the adhesive layer 50 is different from the adhesive layer 60 (e.g. an adhesive which may applied in a pressure sensitive state but then transformed into a structural adhesive by the application of a trigger or merely a standard pressure sensitive adhesive) the primer layer 20 may be eliminated entirely from the construction or may be provided in the form of a primer that is different from the primer layer 40. As mentioned herein, the label 10J also comprises at least one layer of pressure sensitive adhesive 50 which can be the previously noted adhesive TS8017, a standard pressure sensitive adhesive, or a switchable adhesive (i.e. an adhesive applied as a pressure sensitive adhesive and switched to a structural adhesive by the application of a trigger) or standard durable adhesive which do not require primer but still can use it for better performance]. The label 10J also comprises an RFID component 70. For applications in which the label is provided in a roll or self wound form, a single double face liner such as a double siliconized liner or two single sided siliconized liners may be used.

The labels of the present subject matter include a wide array of layer and component(s) arrangements. For example, in certain embodiments the labels can include two primer layers both disposed between the face layer and the adhesive layer. In particular embodiments the adhesive layer is disposed between the primer layer and the RFID component. In other embodiments the RFID component is disposed between the face layer and the adhesive layer. In still additional versions the RFID component is disposed between the face layer and the primer layer. In yet other embodiments the RFID component is disposed between the primer layer and the adhesive layer. In alternative versions the label comprises two face layers, and the RFID component is disposed between the two face layers. In other versions, the RFID component is disposed between a face layer and an adhesive layer. In certain embodiments, the label also comprises two adhesive layers, the RFID component is disposed between the two adhesive layers. In particular embodiments, the label comprises two adhesive layers and two primer layers one of which is adjacent to a first layer of adhesive. In still other versions, the RFID component is disposed between a layer of primer and a second layer of adhesive. And, in yet additional versions, label includes at least one release liner and the RFID component is disposed between an adhesive layer and the release liner.

Many other benefits will no doubt become apparent from future application and development of this technology.

All patents, published patent applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A tire tracking label comprising:
    at least one face layer;
    optionally, at least one primer layer;
    at least one adhesive layer comprising an adhesive; and
    at least one RFID component;
    wherein the adhesive is a multistage adhesive which exhibits pressure sensitive adhesive characteristics at a first stage and exhibits permanent adhesive characteristics at a second stage, and
    wherein the multistage adhesive transitions from the first stage to the second stage upon exposure to at least one of heat and radiation.

2. The tire tracking label of claim 1 further comprising:
    at least one release liner contacting the adhesive layer.

3. The tire tracking label of claim 1 wherein the face layer comprises at least one material selected from the group consisting of polyolefins, polyethylene terephthalate (PET), polyamides (PA), polyimides (PI), polyethylene naphthalate (PEN), cotton, paper, fiberglass, synthetic textiles, and combinations thereof.

4. The tire tracking label of claim 1 wherein the face layer is in a form selected from the group consisting of film form, woven or nonwoven fibrous form, and combinations thereof.

5. The tire tracking label of claim 1 wherein the adhesive is selected from the group consisting of an acrylic adhesive, a rubber-acrylic hybrid adhesive, and combinations thereof.

6. The tire tracking label of claim 1 wherein the RFID component comprises a passive RFID device.

7. The tire tracking label of claim 1 wherein the RFID component comprises an antenna.

8. A labeled rubber-based article comprising:
    a rubber-based article; and
    the tire tracking label of claim 1,
    wherein the label is affixed to the article.

9. The labeled article of claim 8 wherein the article is a tire.

10. The labeled article of claim 9 wherein the label is affixed to a sidewall of the tire.

11. The labeled article of claim 10 wherein the label is affixed to an exterior face of the sidewall or is affixed to an interior face of the sidewall.

12. The labeled article of claim 9 wherein the label is embedded within the tire.

13. A method of identifying a rubber-based article, the method comprising:
    providing a rubber-based article;
    providing the tire tracking label of claim 1; and
    affixing the label to the rubber-based article.

14. The method of claim 13 wherein the affixing comprises adhering the label to the rubber-based article or comprises embedding the label within the rubber-based article.

15. The method of claim 13 wherein the rubber-based article is a tire.

16. The method of claim 13, wherein the RFID component comprises an identifier, the method comprising:
    using an RFID reader, reading the label affixed to the rubber-based article to thereby obtain the identifier.

* * * * *

UNITED STATES PATENT AND TRADEMARK OFFICE
CERTIFICATE OF CORRECTION

| | | |
|---|---|---|
| PATENT NO. | : 11,763,127 B2 | Page 1 of 1 |
| APPLICATION NO. | : 17/938141 | |
| DATED | : September 19, 2023 | |
| INVENTOR(S) | : Pavel Janko, Denis Markov and Jos Uijlenbroek | |

It is certified that error appears in the above-identified patent and that said Letters Patent is hereby corrected as shown below:

On the Title Page

Item [75], Inventors, insert -- Jos UIJLENBROEK, Halsteren (NL) --

Signed and Sealed this
Third Day of December, 2024

Katherine Kelly Vidal
*Director of the United States Patent and Trademark Office*